United States Patent [19]
Ghaem-Maghami et al.

[11] 3,842,201
[45] Oct. 15, 1974

[54] BEAM CURRENT LIMITER

[75] Inventors: Sanjar Ghaem-Maghami, Chesapeake; Howard E. Holshouser, Hobson, both of Va.

[73] Assignee: General Electric Company, Portsmouth, Va.

[22] Filed: Apr. 9, 1973

[21] Appl. No.: 349,650

[52] U.S. Cl. .......................... 178/7.5 R, 178/7.5 DC
[51] Int. Cl. .......................................... H04n 5/44
[58] Field of Search ........ 178/7.3 R, 7.3 DC, 7.5 R, 178/7.5 DC

[56] References Cited

UNITED STATES PATENTS

| | | | |
|---|---|---|---|
| 3,465,095 | 9/1969 | Hansen et al. | 178/7.5 DC |
| 3,674,932 | 7/1972 | Griepentrog | 178/7.5 R |
| 3,735,029 | 5/1973 | Sunstein | 178/7.5 R |

*Primary Examiner*—Robert L. Griffin
*Assistant Examiner*—George G. Stellar

[57] ABSTRACT

Peak detection of a sampling voltage in the ground return path of the cathode ray tube anode supply voltage multiplier develops a relatively large control voltage for controlling cathode ray tube beam current. The large control voltage may be utilized directly to control the DC level of the video amplifier without resort to amplification. Less than unity gain coupling may be employed for greater circuit stability and insensitivity to temperature variation.

4 Claims, 2 Drawing Figures

BEAM CURRENT LIMITER

BACKGROUND OF THE INVENTION

The present invention relates to a beam current limiting circuit for the cathode ray tube of a television receiver and more particularly for the cathode ray tube of a color television receiver.

In the course of the quest to achieve brighter color television pictures with greater contrast, there has arisen the need to protect the picture tube from conditions of excessive brightness. Accordingly, due to the high voltage voltages necessary to apply greater power to the picture tubes in order to produce brighter pictures with more contrast, it is possible, when the brightness control is set to provide considerable brightness, for damage to be brought about in the cathode ray tube by phosphor burnout or by aperture mask distortion due to the intense heat of the high beam current. Due to the prevalence of such conditions, beam current limiting circuits are regularly employed to prevent the resultant harm to the cathode ray tube.

Typically, beam current limiting circuits employ a device to sample the beam current and are connected to the video amplifier to control the brightness and/or contrast of the picture when the beam current tends to become excessive. Since the high voltage supply for the cathode ray tube is derived from the horizontal sweep voltage generating circuit, the device for sampling beam current is often located at a tap on the horizontal output transformer. Since this requires an additional tap on the transformer such a configuration leads to added expense.

In the course of providing higher anode voltage supplies for the cathode ray tube, voltage multiplying devices are employed at the output of the horizontal sweep transformer. It has been discovered that the currents in the ground return path of the voltage multiplying devices provide a suitable indication for monitoring beam current variations.

While beam current limiting circuits are available which utilize the high voltage multiplier ground return path to sample beam current, such circuits have not proved satisfactory in every respect. In particular, such circuits have employed amplification to insure that sufficient signal level is available to control beam current when the predetermined safe limit is exceeded. This amplification has resulted in a circuit that over reacts to quick scene changes or abrupt adjustments of the brightness control to a brighter picture to cause flashing in the picture. Also, such amplifiers are subject to change as a function of temperature and with aging.

Accordingly, it is an object of the present invention to provide a stable beam current limiting circuit.

Another object of the present invention is to provide a beam current limiting circuit that optimizes the sampling signal amplitude to provide a minimum gain stable circuit operation.

These objects are realized in a beam current limiting circuit which is responsive to a voltage obtained from the ground return path of the cathode ray tube high voltage supply multiplier and controls the brightness control of the video amplifier when the sample voltage exceeds a predetermined level. Since the brightness control is ideally a low level voltage circuit the amplifier of the beam current limiting circuit is selected to maintain the brightness control supply voltage constant so long as the sample voltage remains below the predetermined level. When the level is exceeded, a portion of the sample voltage is applied to the brightness control by an emitter follower circuit. The emitter follower, a less than unity gain circuit, is highly stable and can be employed since peak detection of the sample voltage provides a voltage that is sufficiently large, relative to the brightness control supply voltage, so that amplification in the path is not required.

BRIEF DESCRIPTION OF THE DRAWINGS

These and other objects and features of the present invention will be more readily understood from the following detailed description of the invention taken in conjunction with the drawings, in which.

DETAILED DESCRIPTION

Figure 1:
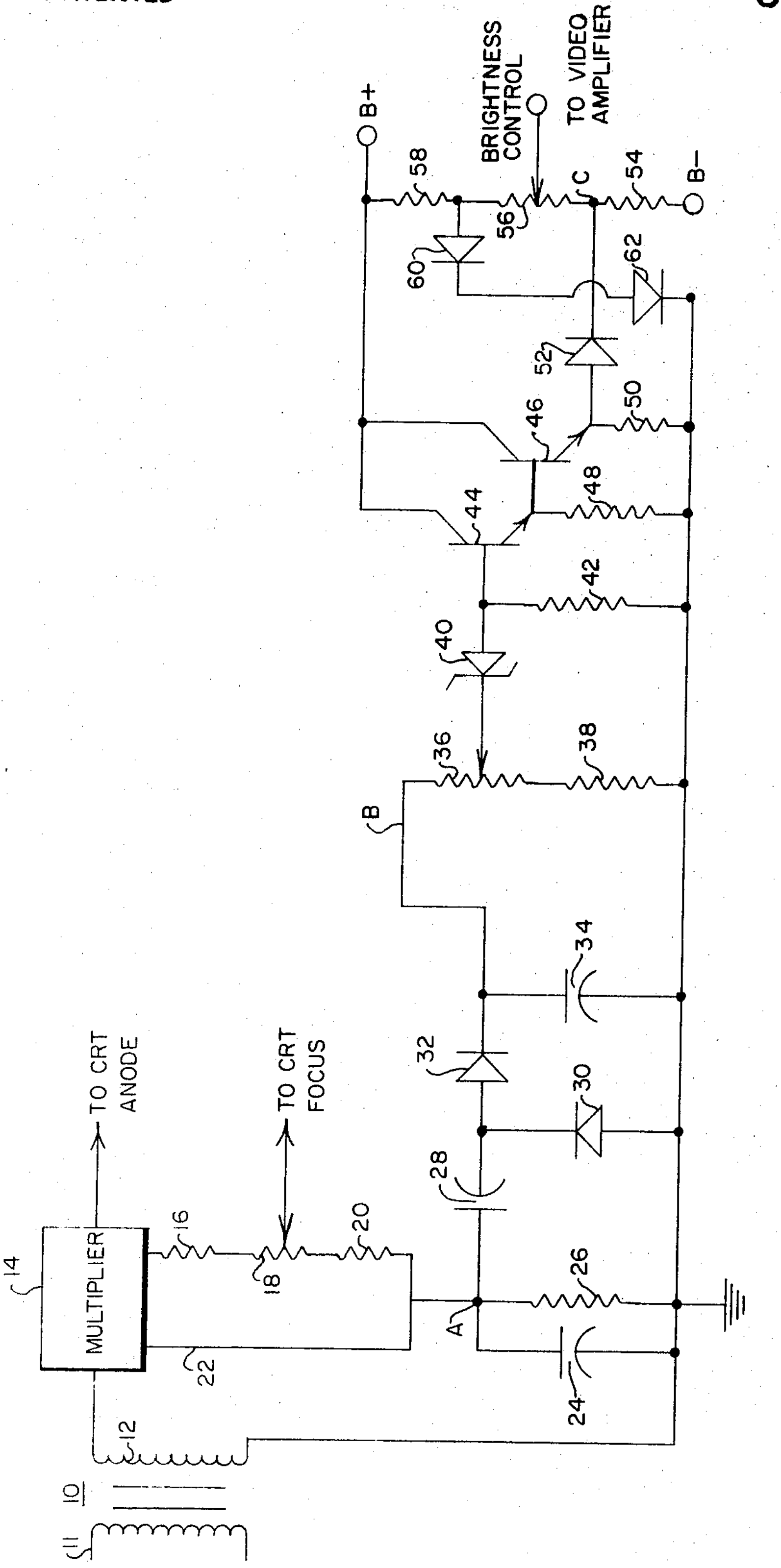
FIG. 1 is a circuit diagram of a beam current limiting circuit in accordance with the present invention.

Referring now to FIG. 1, there is shown the horizontal sweep circuit output transformer 10 having a primary winding 11 which derives a sweep voltage from the sweep circuit. Although not shown a secondary winding is employed to apply the horizontal sweep voltage to the deflection circuit of the cathode ray tube. Normally, and as indicated in the drawing, a tertiary winding 12 is provided to derive a voltage which is applied to multiplier 14. This multiplier may comprise any of the devices known as a doubler or tripler rectifier which steps up and rectifies the voltage to supply a high DC voltage to the cathode ray tube anode. A lead 22 connected to ground through a resistor 26 and shaping capacitor 24 indicates the ground return path for the high voltage multiplier. As also indicated in the drawing, a voltage step down circuit comprising resistors 16 and 20 and potentiometer 18 form a supply for the focus electrode of the cathode ray tube. This voltage divider is also connected to the point A at the top of the resistor 26 and capacitor 24 to share this ground return port.

The voltage at point A is AC coupled by capacitor 28 and rectified by the diode 32. The diode 30 connected between the capacitor 28 and ground comprises a peak-to-peak detector by acting as a clamp to clamp the lowermost excursions of the voltage appearing across resistor 26. The capacitor 34 acts as a storage capacitor to provide a control voltage indicative of the peak variations of the high voltage supply being applied to the cathode ray tube. The control voltage appears across potentiometer 36 and resistor 38 which constitute means for adjusting the level of the control voltage corresponding to the beam current at which beam current limiting begins, i.e. the voltage level at which the threshold established by Zener diode 40 and the emitter-base diode of transistor 44 is overcome. When the control voltage exceeds this threshold level, transistors 44 and 46 conduct the voltage to the brightness control circuit.

Transistors 44 and 46 are both emitter follower amplifiers which serve both as a coupling circuit to couple the control voltage when it exceeds the break-down level of Zener diode 40 to the brightness control circuit, and as a means to control the voltage supply for the brightness control circuit. In this regard, it can be seen that the brightness control circuit is made up of two resistors 54 and 58 and potentiometer 56 connected between a source of minus voltage B− and a source of positive voltage B+ and that the potentiometer 56 serves as a brightness control for the video amplifier of the television receiver. This variable resistor 56 is ideally adjustable between a slightly positive voltage which is maintained at a fixed level by the diodes 60 and 62 which provide a clamp of approximately 1.4 volts to ground and a slightly negative voltage at point C which is maintained by the transistor 46 and the diode 52. thus the brightness control supply is a fixed low voltage which is maintained across the potentiometer 56 by the diodes and the transistor 46. This emitter follower transistor is normally conducting current which flows up through the resistor 48 into the base of the transistor 46 and out through the divided path provided by emitter resistor 50 and the diode 52 and resistor 54 to the B− supply. It is possible by selecting a very low valued resistor 48 to maintain the voltage at point C at a fixed slightly negative value so long as the transistor 44 is in a state of non-conduction.

Transistor 44 is normally off due to the emitter of this transistor being held substantially at ground by resistor 48. Once the Zener diode 40 breaks down, however, the positive control voltage appearing at the output tap of potentiometer 36 will be applied to the base of this transistor and this voltage (minus the emitter-base voltage drops of the transistors 44 and 46 and the diode drop 52) is applied to the brightness control at point C.

Figure 2:
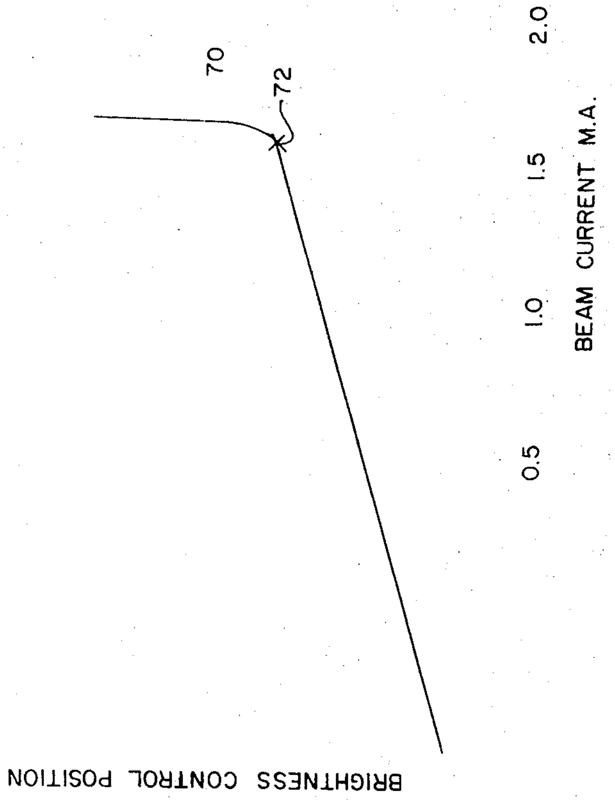
FIG. 2 is a plot of beam current vs. brightness control position to illustrate the response characteristic of the circuit of FIG. 1.

Referring now to FIG. 2, which shows a plot of beam current as a function of brightness control setting, it can be seen that the curve 70 is linear in the range of zero beam current on up to approximately 1.5 milliamps. This linear range is the range of normal operation when no beam current limiting is employed and transistor 44 is not conducting. Thus, if a beam current of 1.5 milliamps is the point at which beam current should begin to be limited, the potentiometer 36 in the beam current limit circuit is set such that the control voltage will just exceed the threshold determined by the Zener diode 40 and the emitter-base conduction voltage of the transistor 44 to turn on this transistor. It can be seen by observing FIG. 2 that the control voltage is large compared to the voltage supply for the brightness control so that there is a sharp change in the slope of the curve indicating that relatively large increases of brightness due to either the position of the brightness control or due to change in picture content will cause very little change in beam current.

By means of the foregoing description it is believed that the advantages and features of the present invention should be readily understood. The beam current limiting circuit that has been described provides for peak-to-peak detection of the voltage sampled to provide a representation of beam current such that a sufficiently large control voltage is obtained to permit the circuit to utilize the stable emitter follower type of amplifier which not only provides isolation between the sampled voltage and the control point but also presents a sufficiently low output impedance to preserve the low level voltage supply to the brightness control for normal non-limited operation.

What is claimed and desired to be secured by Letters Patent of the United States is:

1. In a television receiver having a video amplifier for applying video information to a cathode ray tube and voltage multiplier means to obtain an anode voltage supply for said cathode ray tube, cathode ray tube beam current limiting means comprising:

means in series circuit with the ground return path of said multiplier means for developing a voltage proportional to cathode ray tube beam current, means for detecting the peak-to-peak amplitude of said voltage and responsive thereto to obtain a control voltage proportional to beam current, and control means responsive to said control voltage when said control voltage exceeds a predetermined amplitude to control the DC reference level of said video amplifier by applying a portion of said control voltage to said video amplifier.

2. The invention recited in claim 1 wherein said video amplifier includes a brightness control to establish the DC reference level of said video amplifier and said control means maintain a fixed voltage at said brightness control so long as said control voltage is below said predetermined amplitude.

3. The invention recited in claim 2 wherein said control means comprises an emitter follower amplifier to provide less than unity gain coupling of said control voltage to said brightness control when said control voltage exceeds said predetermined amplitude.

4. In a television receiver including a brightness control having a low level supply voltage for determining the brightness range of the picture displayed by the cathode ray tube of said receiver and voltage multiplying means to obtain a high voltage anode supply for said cathode ray tube, cathode ray tube beam current limiting means comprising:

means in series circuit with the ground return path of said multiplier for developing a voltage proportional to beam current, means for detecting the peak-to-peak amplitude of said voltage and responsive thereto to obtain a DC control voltage proportional to beam current, said control voltage being large relative to said supply voltage, and control means responsive to said control voltage and coupled to said brightness control to maintain said supply voltage at said low level so long as said control voltage is below a predetermined level and applying a substantial portion of said control voltage to said brightness control when said control voltage exceeds said predetermined level to sharply limit picture brightness.

* * * * *